H. HORIUCHI.
FURNACE FOR BURNING LIQUID FUELS AND PULVERULOUS COAL.
APPLICATION FILED MAY 21, 1920.
1,390,715.
Patented Sept. 13, 1921.
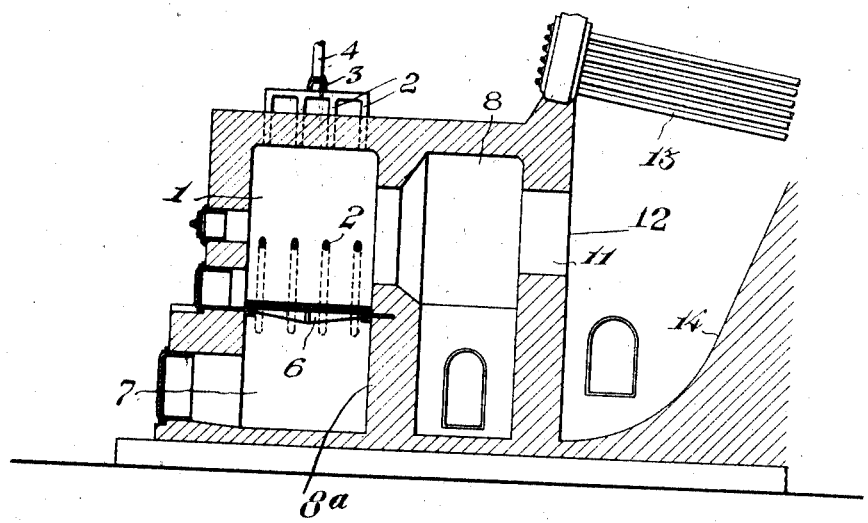
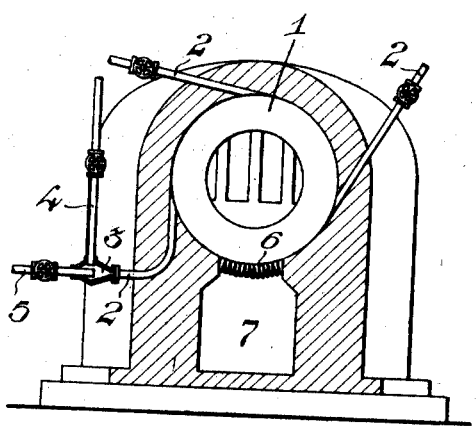
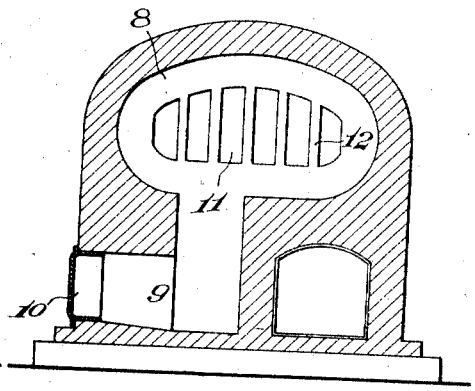

UNITED STATES PATENT OFFICE.

HIROSUKE HORIUCHI, OF TAIHOKU-CHO, JAPAN.

FURNACE FOR BURNING LIQUID FUELS AND PULVERULOUS COAL.

1,390,715.

Specification of Letters Patent.   Patented Sept. 13, 1921.

Application filed May 21, 1920. Serial No. 383,132.

*To all whom it may concern:*

Be it known that I, HIROSUKE HORIUCHI, a subject of the Empire of Japan, residing at 194 Ryuko Kosho, Taihoku-Cho, Taiwan, Japan, have invented certain new and useful Improvements in Furnaces for Burning Liquid Fuels and Pulverulous Coal, of which the following is a specification.

This invention relates to improvements in furnaces and has for its object to provide a furnace wherein maximum heating efficiency of liquid and pulverous fuels is obtained owing to the maximum amount of travel of the fuel effected within the combustion chamber during the combustion.

A further object of the invention resides in the novel arrangement and grouping of the combined air and fuel pipes with respect to the cylindrical combustion chamber by which the maximum fuel burning capacity is obtained, thereby enhancing the heating efficiency of the furnace.

A still further object resides in the provision of an expansion chamber communicating with the combustion chamber and having a series of baffles arranged therein to arrest the rotary movement of the products of combustion to cause them to travel in a direct path for action upon the water tubes or other apparatus for receiving the heat.

A still further object is the provision in a furnace of the pulverous and liquid burning type of a grate for utilization in burning a coarser grade of fuel than that introduced by the combined air and fuel pipes.

With these and other objects in view the invention consists of the novel features of construction which will be hereinafter more specifically described and claimed and illustrated in the accompanying drawing in which:

Figure 1 is a longitudinal sectional view through the improved furnace.

Fig 2 is a vertical transverse sectional view taken through the combustion chamber.

Fig. 3 is a transverse sectional view of the furnace through the expansion chamber.

Referring to the drawing in detail the numeral 1 indicates the combustion chamber of the improved furnace which is substantially circular in cross section and communicates through a division wall 8ᵃ with the expansion chamber 8, the latter being preferably of considerably greater size than the combustion chamber 1. A plurality of combined air and liquid or pulverous fuel supply pipes 2 are connected with the combustion chamber 1 at various points circumferentially of the latter and, as suggested in Fig. 2, arranged substantially tangential to the circular wall of the chamber 1. The pipes 2 are arranged in groups or banks, pipes of each group or bank being spaced apart in the directions of the longitudinal axis of the combustion chamber 1 so as to effect a uniform distribution of air and fuel throughout the entire length of the combustion chamber during the operation of the furnace.

The several pipes 2 are connected in groups or series with mixing chambers, one of which is indicated in Fig. 2 and designated by the numeral 3. Angularly disposed fuel and air supply pipes 4 and 5 respectively, are also extended into each mixing chamber 3, the fuel supply pipe 4 being connected with a suitable fuel supplying device (not shown) and an air supply pipe 5 being connected with a blower (not shown) or other device for producing a draft of air through the air pipe 5.

The lower portion of the combustion chamber 1 is formed by a grate 6 designed to receive and support a grade of fuel not suitable for introduction in the combustion chamber through the pipes 2 whereby such fuel may be burned simultaneously with that introduced through the pipes 2. Below the grate 6, the furnace is provided with an ash-pit 7.

As shown in Fig. 3, the expansion chamber 8 is of non-circular form and is provided in its rear wall with an outlet 11 in which a series of vertical and spaced baffles 12 are arranged so as to arrest the circular movement of the products of combustion passing therethrough and cause them to pass therethrough on a direct line into contact with a wall 14 which is so arranged as to direct the products of combustion against the water tubes 13 or other apparatus in connection with which the heat is to be utilized.

The expansion chamber 8 extends downwardly within the furnace providing the pit 9, for receiving ashes and other incombustible matter.

In the operation of the improved furnace liquid or pulverous fuel is supplied to the mixing chamber 3 of each group of pipes 2 through the fuel supply pipes 4 and, being caught by the air issuing from the discharge end of the air supply pipe 5 is conducted through the pipes 2 into the combustion chamber 1. Owing to the position of the discharge ends of the pipes 2 with respect to the circular wall of the combustion chamber 1, the incoming air and fuel are caused to whirl in a circular path within the combustion chamber, and traveling spirally the products of combustion enter the expansion chamber 8 through the opening in the dividing wall 8ª. Due to the constant contact of the incoming burning fuel with the wall of the combustion chamber 1, the latter is maintained in a highly heated condition and materially assists in effecting combustion of the fuel. Proceeding rearwardly through the expansion chamber 8, the products of combustion pass between the baffles 12 which tend to arrest their circular and spiral movement and cause them to travel direct to the water tubes 13 or other apparatus.

What I claim is:

In a furnace, a combustion chamber approximately circular in cross section, a plurality of combined air and fuel pipes communicating with the combustion chamber and arranged to produce rotary movement of the incoming fuel and air within the chamber, an expansion chamber of substantially elliptical form in cross section communicating with the combustion chamber by a restricted passage and being of greater area in cross section than the combustion chamber, said expansion chamber having an outlet, and a plurality of spaced parallel baffles arranged to arrest the rotary movement of the products of combustion issuing from the expansion chamber.

In testimony whereof I have affixed my signature in presence of two witnesses.

HIROSUKE HORIUCHI.

Witnesses:
RYOZEN HOSUI,
CHUHEI MATSUO.